(12) United States Patent
Delst et al.

(10) Patent No.: US 12,365,802 B2
(45) Date of Patent: Jul. 22, 2025

(54) COMPOSITION INCLUDING A COLOR SHIFTING PIGMENT HAVING A DIFFERENT PARTICLE SIZE

(71) Applicant: VIAVI SOLUTIONS INC., San Jose, CA (US)

(72) Inventors: Cornelis Jan Delst, Fairfax, CA (US); Matthew Ryan Witzman, Windsor, CA (US); Bryan James Clifton, Santa Rosa, CA (US); Paul Thomas Kohlmann, Windsor, CA (US)

(73) Assignee: VIAVI SOLUTIONS INC., Chandler, AZ (US)

( * ) Notice: Subject to any disclaimer, the term of this patent is extended or adjusted under 35 U.S.C. 154(b) by 1105 days.

(21) Appl. No.: 17/105,315

(22) Filed: Nov. 25, 2020

(65) Prior Publication Data

US 2021/0163752 A1 Jun. 3, 2021

Related U.S. Application Data

(60) Provisional application No. 62/942,004, filed on Nov. 29, 2019.

(51) Int. Cl.
*C09C 1/00* (2006.01)
*C09D 7/20* (2018.01)
(Continued)

(52) U.S. Cl.
CPC ............. *C09C 1/0078* (2013.01); *C09D 7/20* (2018.01); *C09D 7/70* (2018.01); *C09D 11/033* (2013.01);
(Continued)

(58) Field of Classification Search
CPC ............... B41J 2/16544; C01P 2004/20; C01P 2004/61; C01P 2006/60; C01P 2006/63; C01P 2006/64; C09C 1/0015; C09C 1/0078; C09C 1/0081; C09C 2200/1054; C09C 2200/30; C09C 2200/304; C09C 2200/305; C09C 2200/306; C09D 11/033; C09D 11/037; C09D 17/001; C09D 17/002; C09D 17/004; C09D 17/006; C09D 5/36;
(Continued)

(56) References Cited

U.S. PATENT DOCUMENTS 6,472,455 B1 10/2002 Bleikolm et al.
10,189,997 B2 1/2019 Delst et al.
(Continued)

FOREIGN PATENT DOCUMENTS

| CN | 102317379 | 1/2012 |
|---|---|---|
| EP | 1325086 B1 | 2/2012 |
| EP | 2531562 B1 | 1/2018 |
| WO | 2019/103937 | 5/2019 |
| WO | 2019131957 A1 | 7/2019 |

*Primary Examiner* — Shuangyi Abu Ali
(74) *Attorney, Agent, or Firm* — Mannava & Kang, P.C.

(57) ABSTRACT

A composition including a first color shifting pigment flake population having a first D50 particle size; and a second color shifting pigment flake population having a second D50 particle size that is different from the first D50 particle size, wherein the first color shifting pigment flake population and the second color shifting pigment flake population have a similar face color and color shift is disclosed. An article including the composition is included. A method of making the composition and a method of making the article are also disclosed.

16 Claims, 1 Drawing Sheet

(51) Int. Cl.
    *C09D 7/40*         (2018.01)
    *C09D 11/033*     (2014.01)
    *C09D 11/037*     (2014.01)
    *C09D 17/00*       (2006.01)

(52) U.S. Cl.
    CPC .......... *C09D 11/037* (2013.01); *C09D 17/001* (2013.01); *C09D 17/002* (2013.01); *C09D 17/006* (2013.01); *C01P 2004/20* (2013.01)

(58) Field of Classification Search
    CPC ... C09D 7/20; C09D 7/62; C09D 7/69; C09D 7/70
    See application file for complete search history.

(56) References Cited

U.S. PATENT DOCUMENTS

| | | |
|---|---|---|
| 12,187,901 B2 | 1/2025 | Delst et al. |
| 2004/0028905 A1 | 2/2004 | Phillips et al. |
| 2006/0228553 A1 | 10/2006 | Argoitia et al. |
| 2007/0098989 A1 | 5/2007 | Raksha et al. |
| 2011/0121556 A1 | 5/2011 | Raksha et al. |
| 2014/0090579 A1 | 4/2014 | Delst et al. |
| 2015/0258837 A1 | 9/2015 | Ritter et al. |
| 2017/0369709 A1 | 12/2017 | Seydel et al. |
| 2019/0225006 A1 | 7/2019 | Kohlmann et al. |
| 2019/0322871 A1 | 10/2019 | Suzuki et al. |
| 2021/0102072 A1 | 4/2021 | Witzman et al. |
| 2021/0371681 A1* | 12/2021 | Omura .................... C09D 7/61 |

\* cited by examiner

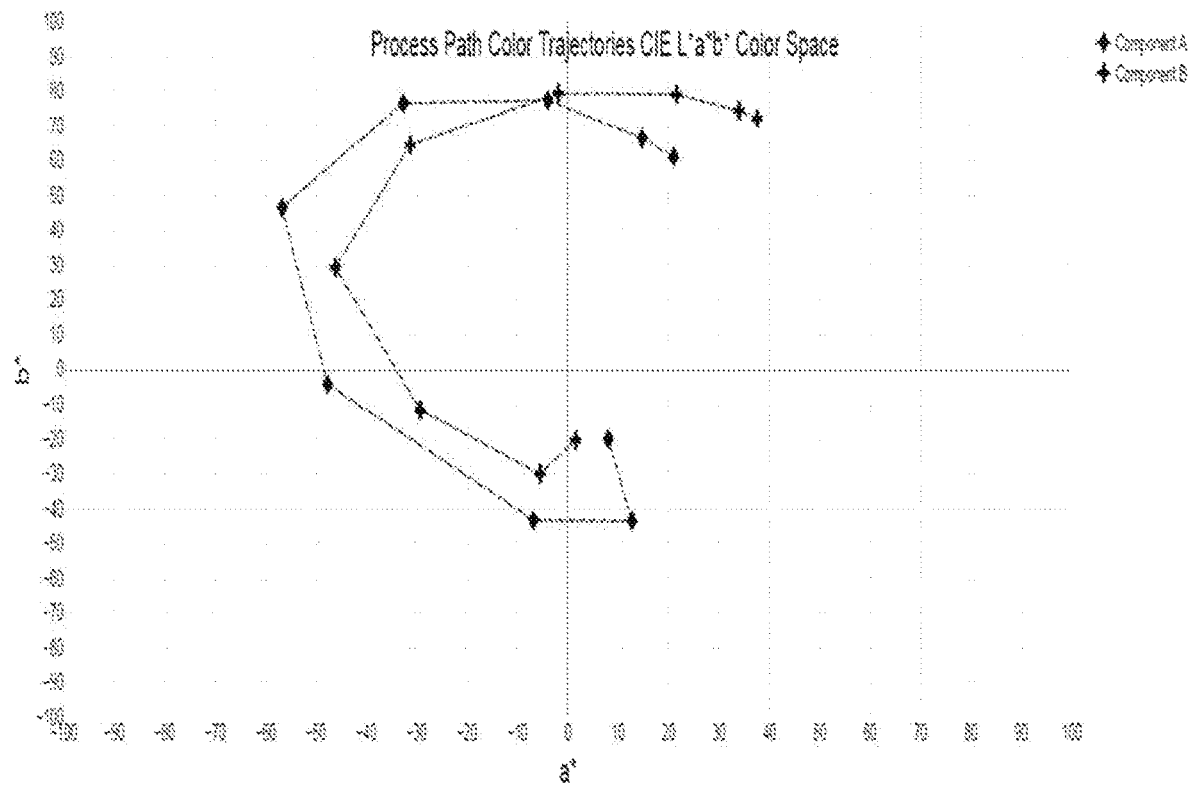

COMPOSITION INCLUDING A COLOR SHIFTING PIGMENT HAVING A DIFFERENT PARTICLE SIZE

RELATED APPLICATION

This application claims priority to U.S. Provisional Patent Application No. 62/942,004, filed Nov. 29, 2019, the disclosure of which is hereby incorporated by reference.

FIELD OF THE INVENTION

The present disclosure generally relates to a composition including a liquid medium, a first color shifting pigment flake population having a first D50 particle size; and a second color shifting pigment flake population having a second D50 particle size that is different from the first D50 particle size, wherein the first color shifting pigment flake population and the second color shifting pigment flake population are present in the liquid medium in a high solids content. A coating composition and an article are also included. Methods of making the composition and a method of making an article are also disclosed.

BACKGROUND OF THE INVENTION

Color shifting pigments and colorants have been used in numerous applications, ranging from automobile paints to anti-counterfeiting inks for security devices, such as documents and currency. Such pigments and colorants exhibit the property of changing color upon variation of the angle of incident light, or as the viewing angle of the observer is shifted. The primary method used to achieve such color shifting is to disperse flakes, which are typically composed of multiple layers of thin films having particular optical characteristics, throughout a liquid medium, to form a paint or ink that can then be subsequently applied to the surface of a substrate.

However, if the flakes are used in a coating composition with a high solids content, such as an ink or paint, then not all of the flakes, such as most of the flakes, are aligned parallel to a substrate. In this manner, the color performance of the coating composition is different from the average face color of the individual flakes. For example, the face color of the coating composition changes in a counter-clockwise direction (in an ab graph representation where magenta to gold to blue is counter-clockwise). As a further example, the hue angle shift with viewing angle is changes, such as reduced, in the coating composition. As another example, the chroma is reduced at all angles. Moreover, the smaller the flake, the further away from color performance of individual flakes (such as vacuum coated foil flakes) the applied coating will be, and the stronger the above effects are.

Random flake orientation lowers color performance of a coating composition. The smaller particle size portion of a flake population having a different color in the coating composition than a larger particle size portion of the flake population makes color performance worse, e.g., low chromaticity and lightness.

SUMMARY OF THE INVENTION

In an aspect, there is disclosed a composition comprising: a first color shifting pigment flake population having a first D50 particle size; and a second color shifting pigment flake population having a second D50 particle size that is different from the first D50 particle size, wherein the first color shifting pigment flake population and the second color shifting pigment flake population are present in the composition in a ratio of from 5:1 to 1:5 by weight; and wherein an optical thickness of a single cavity of a small D50 particle size is on average 1.5 times larger than an optical thickness of dielectric layer of a large D50 particle size.

In another aspect, there is disclosed a method of making a composition comprising: selecting a first color shifting pigment flake population having a first D50 particle size; selecting a second color shifting pigment flake population having a second D50 particle size that is different from the first D50 particle size; and adjusting the D50 particle size of at least one of the first color shifting pigment flake population and the second color shifting pigment flake population to match a color shift between the first color shifting pigment flake population and the second color shifting pigment flake population.

In another aspect, there is disclosed method of making an article, comprising: coating a first area of a substrate with a first color shifting pigment flake population having a first D50 particle size; coating a second area adjacent to the first area of the substrate with a second color shifting pigment flake population having a second D50 particle size that is different from the first D50 particle size; and wherein an optical thickness of a single cavity of a small D50 particle size is on average 1.5 times larger than an optical thickness of dielectric layer of a large D50 particle size.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

BRIEF DESCRIPTION OF THE DRAWINGS

Features of the present disclosure are illustrated by way of example and not limited in the following figure(s), in which like numerals indicate like elements, in which:

FIG. 1 illustrates the color travel for two pigment populations.

DETAILED DESCRIPTION OF THE INVENTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures.

It is to be understood that both the foregoing general description and the following detailed description are exemplary and explanatory only, and are intended to provide an explanation of various embodiments of the present teachings. In its broad and varied embodiments, disclosed herein are compositions including pigments, for example, in the form of foils, sheets, and flakes; and a method of manufacturing the composition. A coating composition can include the composition, and a liquid medium. The coating composition can be in the form of a paint, an ink, a varnish, a colorant composition, etc.

There is disclosed a composition including a first color shifting pigment flake population having a first D50 particle size; and a second color shifting pigment flake population having a second D50 particle size that is different from the first D50 particle size, wherein the first color shifting pigment flake population and the second color shifting pigment flake population are present in the composition in a ratio of from 5:1 to 1:5 by weight; and wherein an optical thickness of a single cavity of a small D50 particle size is on average 1.5 times larger than an optical thickness of a large D50 particle size. The composition can be solidified by curing and/or drying.

Pigments for the first color shifting pigment flake population and for the second color shifting pigment flake population can be made by known techniques, such as by breaking a vacuum coated stack of thin film layers into small particles, such as flakes. In this manner, there can be a wide range of particle sizes.

The "D50" or average particle size can be measured by laser light diffraction and is a type of average particle size expressed as D50 or average diameter. The D50 average particle size is a value measured by using a particle size distribution measuring device and represents a particle sample cut surface diameter, which is 50% by volume or eight after determining the minimum and maximum size of the integrated volume of the specific peak contributing to the particle size distribution. The average (D50) or any other particle size cutoff value can be determined by microscopic examination methods such as optical microscopy (OM), scanning electron microscopy (SEM), and transmission electron microscopy (TEM). The average particle size value measured by microscopy can also be converted to a D50 value by methods known in the art. The particle size distribution of the pigment population can be determined by a screen and mesh classification method known in the art. The particles can be of virtually any shape, such as a flake.

As an example, a first color shifting pigment flake population can have a particle size of D50=10 microns. One of skill in the art would understand that the first pigment flake population would include particles that are smaller than 10 microns and larger than 10 microns. As another example, a second color shifting pigment flake population can have a particle size of D50=20 microns, which would include particles that are smaller than 20 microns and larger than 20 microns. The first color shifting pigment flake population could, in theory, have some flakes that overlap in size with flakes in the second color shifting pigment flake population. However, the D50 of the first color shifting pigment flake population is different from the D50 of the second color shifting pigment flake population. To be clear, one of the two pigment flake populations has a small D50 particle size and the other of two pigment flake populations has a large D50 particle size, relative to one another.

The first color shifting pigment flake population and the second color shifting pigment flake population can be present in the composition in a ratio of from about 5:1 to about 1:5 by weight; for example, from about 1:4.5 to about 4.5:1; and as a further example from about 1:4 to about 4:1, by weight relative to the total weight of the composition.

The first D50 particle size of the first color shifting pigment flake population can include a subset of small sized pigment flakes that do not contribute to a color performance of the composition. The second D50 particle size of the second color shifting pigment flake population can include a subset of large sized pigment flakes that do not contribute to a color performance of the composition.

The first color shifting pigment flake population and the second color shifting pigment flake population can each be present in a blend that reduces the percentage of flakes that do not contribute to a color performance of the composition. For example, the composition can exhibit an improved color performance as compared to a composition including one of the first color shifting pigment flake population or the second color shifting pigment flake population alone. As another example, the composition can exhibit an improved color performance as compared to a composition including the first color shifting pigment flake population and the second color shifting pigment flake population with the same D50 particle size.

A hue of the face color of each of the first color shifting pigment flake population and the second color shifting pigment flake population is within about 30 degrees, when applied separately. In an aspect, a hue of the face color of each population is within about 25 to about 35 degrees, when applied separately. In another aspect, a hue of the face color of each population is within about 22 to about 40 degrees, when applied separately.

The first color shifting pigment flake population and the second color shifting pigment flake population can each include a reflector layer, a dielectric layer, and an absorber layer. In an aspect, the color shifting pigment in the first pigment flake population can be the same or different from the color shifting pigment in the second pigment flake population. For example, one of the two pigment flake populations can include a dual cavity pigment that color shifts from orange to green and has a D50 of 20 microns. The other of the two pigment flake populations can include a 4 QW pigment that color shifts from orange to green and has a D50 of 10 microns.

The reflector layer can be a metal layer. Non-limiting examples of suitable metallic materials for the reflector layer nclude aluminum, silver, copper, gold, platinum, tin, titanium, palladium, nickel, cobalt, rhodium, niobium, chromium, and combinations or alloys thereof. In an aspect, the thickness of the reflector layer can be sufficient for making the layer opaque. The reflector layer can be formed to have a suitable physical thickness of from about 40 to about 2,000 nm, and for example from about 60 to about 1,000 nm. The reflector layer can have a reflectivity of at least 40% and for example higher than 60%.

The absorber layer can be partially absorbing, partially light transmitting, possibly a metal layer with a thickness in the range of from about 5 to about 15 nm. Non-limiting examples of suitable light-absorber materials include metallic absorbers such as chromium, aluminum, nickel, silver, copper, palladium, platinum, titanium, vanadium, cobalt, iron, tin, tungsten, molybdenum, rhodium, and niobium, as well as their corresponding oxides, sulfides, and carbides. Other suitable light-absorber materials include carbon, graphite, silicon, germanium, cermet, ferric oxide or other metal oxides, metals mixed in a dielectric matrix, and other substances that are capable of acting as a uniform or selective absorber in the visible spectrum. Various combinations, mixtures, compounds, or alloys of the above absorber materials can be used to form the absorber layer.

Examples of suitable alloys of the above absorber materials include Inconel (NiCr—Fe), stainless steels, Hastalloys (e.g., Ni—Mo—Fe; Ni—Mo—Fe—Cr; Ni—Si—Cu) and titanium-based alloys, such as titanium mixed with carbon (Ti/C), titanium mixed with tungsten (Ti/W), titanium mixed with niobium (Ti/Nb), and titanium mixed with silicon (Ti/Si), and combinations thereof. As mentioned above, the absorber layer can also be composed of an absorbing metal oxide, metal sulfide, metal carbide, or combinations thereof. For example, an absorbing sulfide material is silver sulfide. Other non-limiting examples of suitable compounds for the absorber layer nclude titanium-based compounds such as titanium nitride (TiN), titanium oxynitride ($TiN_xO_y$), titanium carbide (TiC), titanium nitride carbide ($TiN_xC_z$), titanium oxynitride carbide ($TiN_xO_yC_z$), titanium silicide ($TiSi_2$), titanium boride ($TiB_2$), and combinations thereof. In the case of $TiN_xO_y$ and $TiN_xO_yC_z$, for example x=0 to 1, y=0 to 1, and z=0 to 1, where x+y=1 in $TiN_xO_y$, and x+y+z=1 in $TiN_xO_yC_z$. For $TiN_xC_y$, for example x=0 to 1 and z=0 to 1, where x+z=1. Alternatively, the absorber layer can be composed of a titanium-based alloy disposed in a matrix of Ti, or can be composed of Ti disposed in a matrix of a titanium-based alloy.

A dielectric layer can act as a spacer layer. The spacer layer can be formed to have an effective optical thickness for imparting interference color and desired color shifting properties. The spacer layer can be optionally clear, or can be selectively absorbing so as to contribute to the color effect of a pigment.

The optical thickness is a well-known optical parameter defined as the product ηd, where η is the refractive index of the layer and d is the physical thickness of the layer. Typically, the optical thickness of a layer is expressed in terms of a quarter wave optical thickness (QWOT). The QWOT condition occurs when ηd=λ/4, and λ is the wavelength where optical interference occurs. The optical thickness of dielectric layers can range from about 2 QWOT at a design wavelength of about 400 nm to about 9 QWOT at a design wavelength of about 700 nm, and for example 2, 4, or 6 QWOT at a design wavelength in the range of 400-700 nm, depending upon the color shift desired. In an aspect, an optical thickness of a single cavity of a small D50 particle size (i.e., the pigment flake population that has the smaller D50 particle size) can be on average 1.5 times larger than an optical thickness of a large D50 particle size (i.e., the pigment flake population that has the larger D50 particle size). In another aspect, the smaller D50 particle size can have a single cavity of 4 QWOT and the larger D50 particle size can have a dual cavity of 2 QWOT.

The dielectric layer can typically have a physical thickness of about 100 nm to about 800 nm, depending on the color characteristics desired.

Suitable materials for a dielectric layer include those having a "high" index of refraction, defined herein as greater than about 1.65, as well as those have a "low" index of refraction, which is defined herein as about 1.65 or less. A dielectric layer can be formed of a single material or with a variety of material combinations. For example, a dielectric layer can be formed of only a low index material or only a high index material, a mixture or multiple sublayers of two or more low index materials, a mixtureor multiple sublayers of two or more high index materials, or a mixture or multiple sublayers of low index and high index materials. In addition, the dielectric layer can be formed partially or entirely of high/low dielectric optical stacks, which are discussed in further detail below. When a dielectric layer is formed partially with a dielectric optical stack, the remaining portion of the dielectric layer can be formed with a single material or various material combinations as described above.

Examples of suitable high refractive index materials for the dielectric layer include zinc sulfide (ZnS), zinc oxide (ZnO), zirconium oxide ($ZrO_2$), titanium dioxide ($TiO_2$), diamond-like carbon, indium oxide ($In_2O_3$), indium-tin-oxide (ITO), tantalum pentoxide ($Ta_2O_5$), ceric oxide ($CeO_2$), yttrium oxide ($Y_2O_3$), europium oxide ($Eu_2O_3$), iron oxides such as (II)diiron(III) oxide ($Fe_3O_4$) and ferric oxide ($Fe_2O_3$), hafnium nitride (HfN), hafnium carbide (HfC), hafnium oxide ($HfO_2$), lanthanum oxide ($La_2O_3$), magnesium oxide (MgO), neodymium oxide (NdO), praseodymium oxide ($Pr_6O_{11}$), samarium oxide ($Sm_2O_3$), antimony trioxide ($Sb_2O_3$), silicon monoxide (SiO), selenium trioxide ($Se_2O_3$), tin oxide ($SnO_2$), tungsten trioxide ($WO_3$), combinations thereof, and the like.

Suitable low refractive index materials for the dielectric layer include silicon dioxide ($SiO_2$), aluminum oxide ($Al_2O_3$), metal fluorides such as magnesium fluoride ($MgF_2$), aluminum fluoride ($AlF_3$), cerium fluoride ($CeF_3$), lanthanum fluoride ($LaF_3$), sodium aluminum fluorides (e.g., $Na_3AlF_6$ or $Na_5Al_3F_{14}$), neodymium fluoride ($NdF_3$), samarium fluoride ($SmF_3$), barium fluoride ($BaF_2$), calcium fluoride ($CaF_2$), lithium fluoride (LiF), combinations thereof, or any other low index material having an index of refraction of about 1.65 or less. For example, organic monomers and polymers can be utilized as low index materials, including dienes or alkenes such as acrylates (e.g., methacrylate), perfluoroalkenes, polytetrafluoroethylene (Teflon), fluorinated ethylene propylene (FEP), combinations thereof, and the like.

The composition can include a liquid medium in which the composition, such as the first pigment flake population and the second pigment flake population, is dispersed. The liquid medium can be any medium for dispersing the composition, such as water or a solvent. Non-limiting examples of solvents can include acetates, such as ethyl acetate, propyl acetate, and butyl acetate; acetone; ketones, such as dimethyl ketone (DMK), methylethyl ketone (MEK), sec-butyl methyl ketone (SBMK), ter-butyl methyl ketone (TBMK), cyclopenthanon, and anisole; glycol and glycol derivatives, such as propylene glycol methyl ether, and propylene glycol methyl ether acetate; alcohols, such as isopropyl alcohol, and diacetone alcohol; esters, such as malonates; heterocyclic solvents, such as n-methyl pyrrolidone; hydrocarbons, such as toluene, and xylene; coalescing solvents, such as glycol ethers; and mixtures thereof. The liquid medium can include various polymeric compositions or organic binders such as, acrylic melamine, urethanes, polyesters, vinyl resins, acrylates, methyl methacrylate, ABS resins, epoxies, styrenes, mixtures thereof, as well as others well known to those skilled in the art, such as ink and paint formulations, for example those based on alkyd resins.

The first color shifting pigment flake population and the second color shifting pigment flake population can be present in the liquid medium in a high solids content. The high solids content can range from about 50% to about 100%, for example from about 55% to about 98%, and as a further example from about 60% to about 90%. In some aspects, the high solids content can be greater than 75%. In some aspects, the composition can have a solids content ranging from about 80% to about 100%, for example from about 85% to 95%.

The composition can have a high solids content so that a risk of the composition shrinking, upon curing and/or drying, is reduced. If the composition shrinks, the high solids content can reduce the likelihood of the alignment of the flakes in the composition.

The coating composition can be in the form of a paint, an ink, a varnish, or a colorant composition.

When pigment flakes are present in a coating composition that is printed, the flakes are not all parallel to a surface that is being printed on. When a flake is at an angle the color shifts, hue moves counter clockwise in a graph, such as FIG. 1. The hue of the coating composition moves counter clockwise relative to the hue angle of the foil the pigment was made of. The degree to which the hue angle changes can be determined by the average of off-parallel flake angle. If all flakes were perfectly parallel with the substrate the hue angle would not be different, but that as not what happens in a coating composition. The smaller the D50 of the pigment population, the larger the average off-parallel angle of the flakes is, which results in a larger hue change from foil to coating composition. Larger flakes tend to align more parallel to a substrate surface.

The reality of a coating composition with color shifting flakes is that there is a limit for the viewing angle. Above a certain angle, light bounces off the top surface of the coating composition (Snellius), or gets trapped in the coating composition. The result is that the hue angle shift range of a coating composition with color shifting pigments is less than foil, and more so with smaller particle sizes. With the larger spread of flake angles, the light trapping can happen at a smaller viewing angle. The net effect is that smaller flakes show a smaller hue angle shift than larger flakes, that have a smaller hue angle shift than foil. So, a flake that normally shifts to blue in a large particle size can be adjusted to a smaller particle size so that the color shift stops at green.

There is also disclosed an article comprising a substrate with a layer of the coating composition. The coating composition can be applied as a layer to a surface of a substrate to form a security device, such as a banknote. The substrate can be any suitable material, such as paper, foil, plastic, web, that can receive the coating composition. Non-limiting examples of suitable substrate materials include polymer web, such as polyethylene terephthalate (PET), glass foil, glass sheets, polymeric foils, polymeric sheets, metal foils, metal sheets, ceramic foils, ceramic sheets, ionic liquid, paper, silicon wafers, etc.

A method of making a composition can include selecting a first color shifting pigment flake population having a first D50 particle size; electing a second color shifting pigment flake population having a second D50 particle size that is different from the first D50 particle size; and adjusting the D50 particle size of at least one of the first color shifting pigment flake population and the second color shifting pigment flake population to match a color shift between the first color shifting pigment flake population and the second color shifting pigment flake population. In an aspect, the first color shifting pigment flake population and the second color shifting pigment flake population are present in the composition in a ratio of from 5:1 to 1:5 by weight. In another aspect, an optical thickness of single cavity of a small D50 particle size is on average 1.5 times larger than an optical thickness of dielectric layer of a large D50 particle size.

A method of making an article can include coating a first area of a substrate with a first color shifting pigment flake population having a first D50 particle size; coating a second area adjacent to the first area of the substrate with a second color shifting pigment flake population having a second D50 particle size that is different from the first D50 particle size; and wherein an optical thickness of a single cavity of a small D50 particle size is on average 1.5 times larger than an optical thickness of dielectric layer of a large D50 particle size. In an aspect, the first color shifting pigment flake population and the second color shifting pigment flake population have a similar face color at normal and different colors at viewing angles other than normal. In this manner, the hue angle and the color of the first area and the second area can be made to visually match. It is noted that the color match occurs after making the article and can vary depending upon the method used to coat the substrate. Various methods can include drawn downs and Intaglio printing. The average flake color is offset to compensate for the hue angle shift caused by different particle alignment in the liquid medium. Due to the different hue shift by angle, the first and second area can appear to have a similar color in some viewing conditions and a non-similar color at others.

In an aspect, the optical design of the first color shifting pigment flake population can be similar to the second color shifting pigment flake population, other than by a small offset to adjust color. In this manner, a reflected spectrum can be similar and a color match can occur regardless of the illumination spectrum, resulting in a spectral match as well.

EXAMPLES

Example 1—FIG. 1 illustrates the color travel for two pigment populations. Component A is a single cavity pigment with a dielectric thickness of 405 nm, and Component B is a dual cavity pigment with a dielectric thickness, of each cavity, of 205 nm. Each of A and B are a foil, i.e., a PET film having a stack of layers (aluminum/magnesium fluoride/chromium).

A number of color shifting flakes at various angles create an offset, which can be described as an addition to viewing angle. The flakes individually are specular and under commonly used illumination conditions there is not enough reflected light at high viewing angles to show color. There can also be light trapping in the coating composition, such as an ink, against the surface at high viewing angles. This combined with the offset can effectively reduce the perceived hue angle.

As shown in FIG. 1, the curve starts at the counterclockwise point at face angle (0 degrees from perpendicular view). Each tick mark going counterclockwise on the curves is 10 degrees viewing/illumination angle change. At 30 degrees component B is around 95 degrees hue and component A is around 130 degrees hue. A blend of these two designs in the same particle size would result in a poor low chromaticity color at angle as the two designs shift color at a different rate. Component A has a high Chroma face color, much better than component B, but shifted a little too slow to show an attractive green color at angle. The viewing angle required to get to green is large. Component B has a nice color at angle but shifts far too quickly, it easily reached blue at angle, the visual perception is that it skips green, it shifted so quickly.

The goal is a color that shifts from a high chromaticity Orange to a high chromaticity green. In order to achieve this goal, a composition disclosed herein was made. Component B was ground to a substantially smaller D50 particle size. This reduced the shift in a printed high solids ink because the smaller sized pigment flakes were more randomly oriented than the larger D50 particle size flakes of Component A. The result was that the color shift with angle of Component A more closely matched the color shift with angle of Component B and did not dilute the green at angle of that color with blue. Instead, by still having Component A shift slightly more than Component B, adjusted by the D50 particle size, the desired green showed at a smaller angle than with just Component B. The result was a better color performance than with either of Component A or B separately.

Grinding Component A smaller resulted in the desired color shift characteristics but with a loss of metallic effect due to small particle size (loss of sparkle) as well as a low chromaticity face color.

Blending with the larger particles of Component A resolved both issues.

Using only Component B resulted in a slower than desired color shift and a lower chromaticity of the color at angle.

Example 2

Compositions were used to make an intaglio printed color shifting feature having an orange color (face color) in perpendicular view and a green color at a viewing angle (angle color). The pigment flake for each population was made with the same materials, i.e., an aluminum reflector layer, one or more magnesium fluoride dielectric layers, and one or more chromium absorber layers. A first pigment flake population included a 4 QW materials (magnesium fluoride thickness at 400 nm) on each Side of the aluminum reflector and covered by chromium layer on each side. A second pigment flake population included a dual cavity material (magnesium fluoride 230 nm) on each side of the aluminum reflector and covered by chromium layer on each side.

Comparative Example A—A first comparative composition made Intaglio prints with a common particle size for color shifting pigments, 20 micron D50, i.e., both the first pigment flake population and the second pigment flake population had the same D50 particle size. The first pigment flake population, 4 QW material, had a relatively low chromaticity face color and shifted color rapidly. However, it shifted quickly through green and reached blue. The intermediate green was hardly noticeable. The second pigment flake population, the dual cavity material, had a high chromaticity Orange face color, but did not show Green until at a rather high viewing angle.

Comparative Example B—The first pigment flake popu lation was used with an 11 micron D50, which results in a greatly reduced color shift angle. Instead of shifting to blue, it reached green, but still at a smaller angle change as compared to the second pigment flake population with a 20 micron D50. This reduced hue angle change was an unexpected effect and contributed to the more random angle distribution of the smaller pigment flakes in the high solids ink. Printing 100% 40 W in small particle size resulted in a high chromaticity Green at angle but a low chromaticity and somewhat dull face color. The metallic effect, the sparkle, was lost due to the small particle size.

Comparative Example C—The second pigment flake population was used with an 11 micron D50, which resulted in a high chromaticity face color and a high chromaticity angle color but a green at angle requires a more than desirable large viewing angle Inventive Example—A composition, as disclosed herein, of 50 wt. % of the second pigment flake population with a 20 micron D50 and a 50 wt. % of the first pigment flake population with an 11 micron D50 was made. This resulted in a better color performance as compared to Comparative Example 1. By blending two pigment flake populations with different D50 particle sizes, in which the smaller particle size had a larger color shift with angle, the visual performance, face color, color and angle and color shift properties were optimized.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This disclosure is to be broadly construed. It is intended that this disclosure disclose equivalents, means, systems and methods to achieve the devices, activities and mechanical actions disclosed herein. For each composition, device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards a composition and its many aspects, features and elements. Such a composition can be dynamic in its use and operation, this disclosure is intended to encompass the equivalents, means, systems and methods of the use of the composition and/or optical device of manufacture and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A composition comprising:
   a first color shifting pigment flake population including pigments having a first D50 particle size; and
   a second color shifting pigment flake population including pigments having a second D50 particle size that is larger than the first D50 particle size,
   wherein the first color shifting pigment flake population and the second color shifting pigment flake population are present in the composition in a ratio of from 5:1 to 1:5 by weight;
   wherein the pigments of the first color shifting flake population include a single cavity having a first optical thickness and wherein the pigments of the second color shifting pigment flake population include a dielectric layer having a second optical thickness, wherein the first optical thickness is on average 1.5 times larger than the second optical thickness; and
   wherein a hue of a face color at a normal viewing angle of each of the first color shifting pigment flake population and the second color shifting pigment flake population is within about 22 to about 40 degrees, when applied separately.

2. The composition of claim 1, wherein the color performance of the composition is different to the color performance of a composition including one of the first color shifting pigment flake population or the second color shifting pigment flake population alone.

3. The composition of claim 1, wherein the first optical thickness is 4 QWOT.

4. The composition of claim 1, wherein the second optical thickness is 2 QWOT and the pigments of the second color shifting pigment flake population have a dual cavity.

5. The composition of claim 1, wherein a hue of the face color of each of the first pigment flake population and the second pigment flake population is within 30 degrees, when applied separately.

6. A coating composition comprising:
a liquid medium; and
the composition of claim 1.

7. The coating composition of claim 6, wherein the liquid medium is a medium chosen from water, and a solvent.

8. The coating composition of claim 6, wherein the composition has a solids content ranging from about 50% to about 100%.

9. The coating composition of claim 6, wherein the coating composition is in the form of a paint, an ink, a varnish, or a colorant composition.

10. An article, comprising:
a substrate with a layer of the coating composition of claim 6.

11. The article of claim 10, wherein the substrate is paper, foil, plastic, or web.

12. A method of making a composition comprising:
selecting a first color shifting pigment flake population including pigments having a first D50 particle size;
selecting a second color shifting pigment flake population including pigments having a second D50 particle size that is larger than the first D50 particle size; and
adjusting the D50 particle size of at least one of the first color shifting pigment flake population and the second color shifting pigment flake population to match a color shift between the first color shifting pigment flake population and the second color shifting pigment flake population;
wherein the first color shifting pigment flake population and the second color shifting pigment flake population are present in the composition in a ratio of from 5:1 to 1:5 by weight; and
wherein the pigments of the first color shifting flake population include a single cavity having a first optical thickness and wherein the pigments of the second color shifting pigment flake population include a dielectric layer having a second optical thickness, wherein the first optical thickness is on average 1.5 times larger than the second optical thickness;
wherein a hue of a face color at a normal viewing angle of each of the first color shifting pigment flake population and the second color shifting pigment flake population is within about 22 to about 40 degrees, when applied separately.

13. A composition comprising:
a first color shifting pigment flake population including single cavity pigments having a first D50 particle size; and
a second color shifting pigment flake population including dual cavity pigments having a second D50 particle size that is larger than the first D50 particle size,
wherein the first color shifting pigment flake population and the second color shifting pigment flake population are present in the composition in a ratio of from 5:1 to 1:5 by weight;
wherein an optical thickness of the single cavity of the single cavity pigments is 4 QWOT and an optical thickness of a cavity of the dual cavity pigments is 2 QWOT; and
wherein a hue of a face color at a normal viewing angle of each of the first color shifting pigment flake population and the second color shifting pigment flake population is within about 22 to about 40 degrees, when applied separately.

14. The composition of claim 13, wherein a hue of the face color of each of the first pigment flake population and the second pigment flake population is within 30 degrees, when applied separately.

15. A composition comprising:
a first color shifting pigment flake population including single cavity pigments having a first D50 particle size; and
a second color shifting pigment flake population including dual cavity pigments having a second D50 particle size that is larger than the first D50 particle size,
wherein the first color shifting pigment flake population and the second color shifting pigment flake population are present in the composition in a ratio of from 5:1 to 1:5 by weight;
wherein a first optical thickness of the single cavity of the single cavity pigments is 4 QWOT or 6 QWOT and a second optical thickness of a cavity of the dual cavity pigments is 2 QWOT or 4 QWOT, the first optical thickness being larger than the second optical thickness; and
wherein a hue of a face color at a normal viewing angle of each of the first color shifting pigment flake population and the second color shifting pigment flake population is within about 22 to about 40 degrees, when applied separately.

16. The composition of claim 15, wherein a hue of the face color of each of the first pigment flake population and the second pigment flake population is within 30 degrees, when applied separately.

* * * * *